United States Patent [19]
Morgan

[11] Patent Number: 5,874,952
[45] Date of Patent: Feb. 23, 1999

[54] METHOD AND APPARATUS FOR IMPROVED GRAPHICAL USER INTERFACE WITH FUNCTION ICONS

[75] Inventor: Oliver F. Morgan, San Jose, Calif.

[73] Assignees: Sony Corporation, Tokyo, Japan; Sony Electronics, Inc., Park Ridge, N.J.

[21] Appl. No.: 748,156

[22] Filed: Nov. 12, 1996

Related U.S. Application Data

[63] Continuation of Ser. No. 418,526, Apr. 7, 1995, abandoned.

[51] Int. Cl.⁶ .................................................. G06F 15/00
[52] U.S. Cl. ......................... 345/328; 345/340; 345/348
[58] Field of Search ................................. 395/328, 329, 395/340, 348, 349

[56] References Cited

U.S. PATENT DOCUMENTS

| | | | |
|---|---|---|---|
| 5,040,131 | 8/1991 | Torres | 395/156 |
| 5,235,679 | 8/1993 | Yoshizawa et al. | 395/336 |
| 5,301,301 | 4/1994 | Kodosky et al. | 395/500 |
| 5,339,393 | 8/1994 | Duffy et al. | 395/154 |
| 5,377,318 | 12/1994 | Wolber | 395/159 |
| 5,388,203 | 2/1995 | Kaneko | 395/159 |
| 5,390,296 | 2/1995 | Crandall et al. | 395/159 |
| 5,422,993 | 6/1995 | Fleming | 345/348 |
| 5,442,744 | 8/1995 | Piech et al. | 395/154 |
| 5,455,903 | 10/1995 | Jolissaint et al. | 395/155 |
| 5,502,805 | 3/1996 | Anderson et al. | 395/148 |

FOREIGN PATENT DOCUMENTS

| | | |
|---|---|---|
| 0468911 | 7/1991 | European Pat. Off. . |
| 0570137 | 4/1993 | European Pat. Off. . |
| 2254989 | 10/1992 | United Kingdom . |

*Primary Examiner*—Ba Huynh
*Attorney, Agent, or Firm*—Blakely, Sokoloff, Taylor & Zafman

[57] ABSTRACT

The present invention provides apparatus and methods for use in computer display systems, and in particular, a graphical user interface for use in computer systems. The user interface of the present invention includes a function palette that displays a variety of function icons. Each function icon corresponds to a function that a user may wish to perform. The user selects a function icon from the palette corresponding to the desired function and the user places a copy of the icon at that point in the display where the function is to be performed. For example, in the context of a multimedia video editor, the user may place an icon on a timeline that corresponds to source material. The desired function will then be performed on the source material at that point where the user placed the icon, either immediately or upon subsequent command from the user.

12 Claims, 8 Drawing Sheets

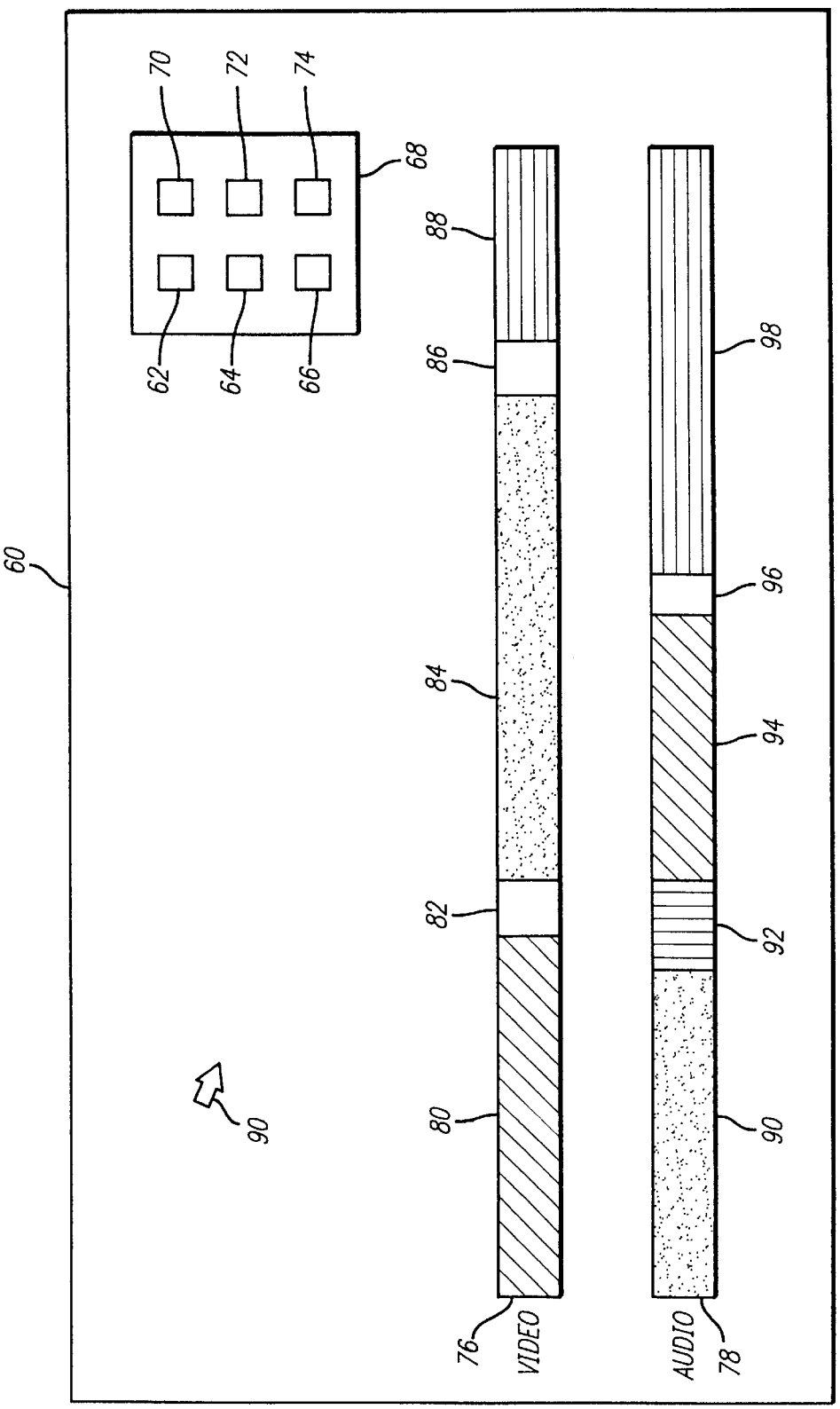

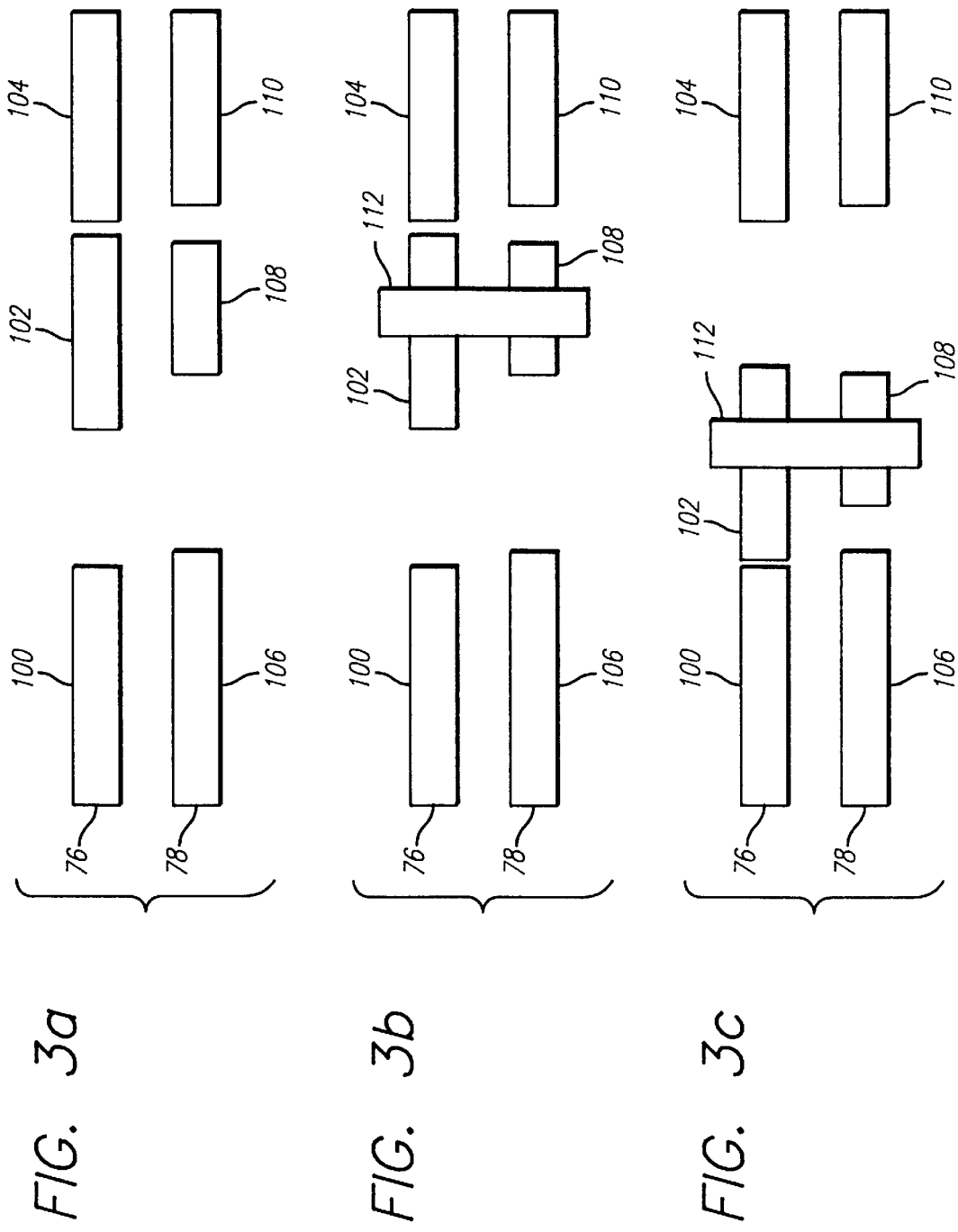

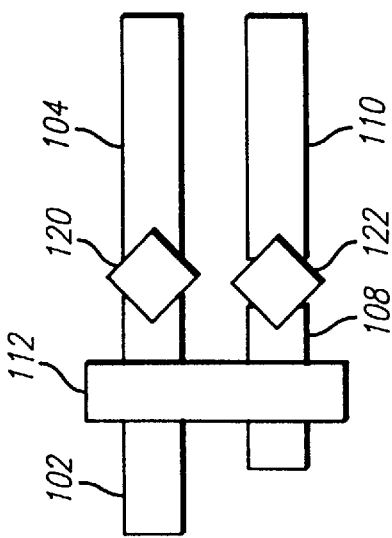
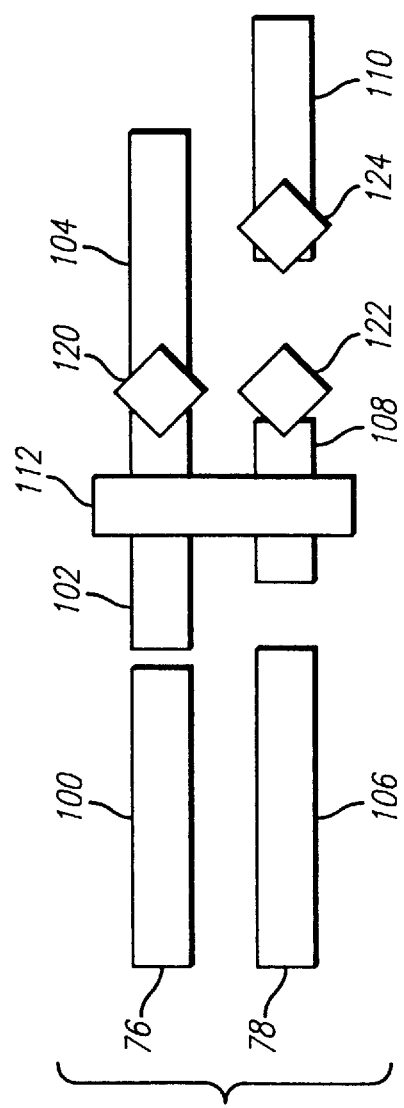
FIG. 4a
FIG. 4b

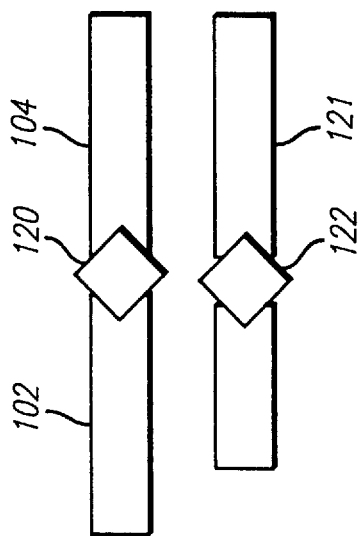
FIG. 5a
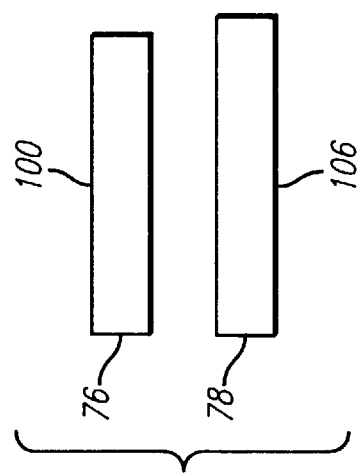
FIG. 5b
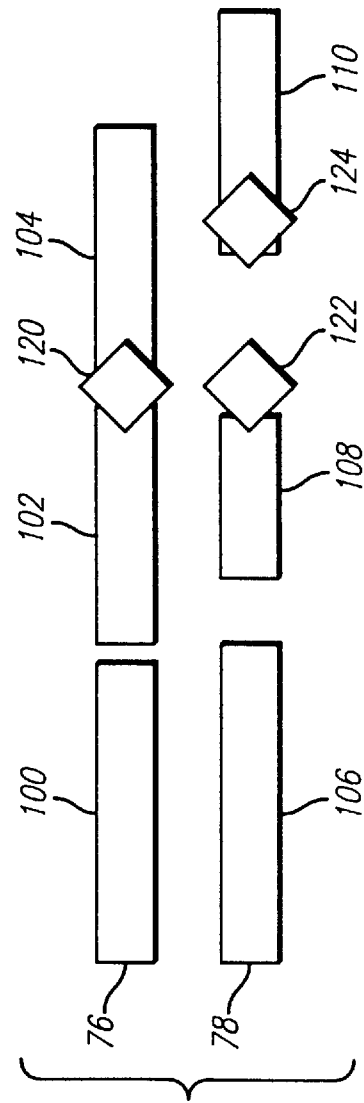

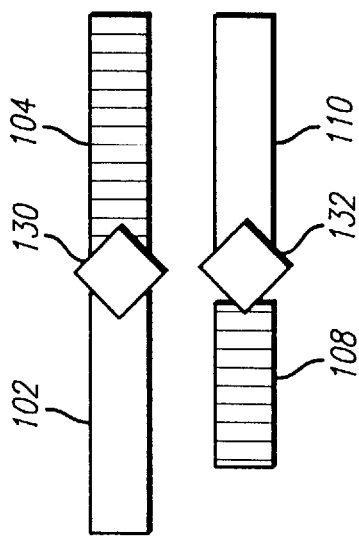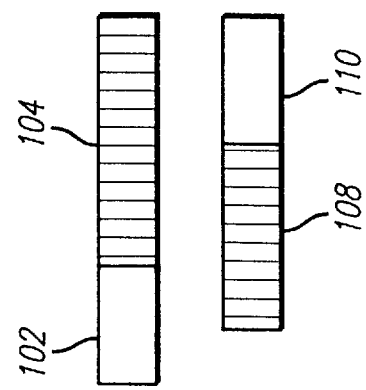
FIG. 6a
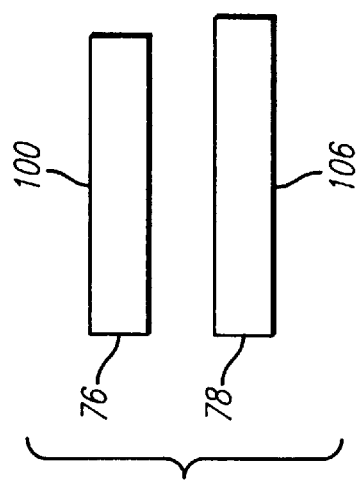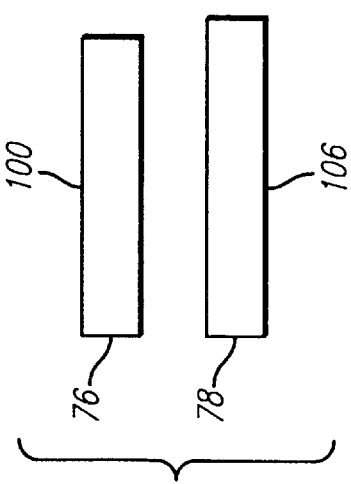
FIG. 6b

FIG. 7b

| | A | B | C |
|---|---|---|---|
| 6X | = A1 * A2 | = B1 * B2 | = C1 * C2 |
| 7X | = A1 * A3 | = B1 * B3 | = C1 * C3 |
| 8X | = A1 * A4 | = B1 * B4 | = C1 * C4 |
| ...... | ...... | | |
| N | = A1 + A2 | = BN + A2 | |

METHOD AND APPARATUS FOR IMPROVED GRAPHICAL USER INTERFACE WITH FUNCTION ICONS

This is a continuation of application Ser. No. 08/418,526 filed Apr. 7, 1995, now abandoned.

BACKGROUND OF THE INVENTION

1. Field of the Invention

The present invention relates to apparatus and methods for displaying, manipulating, and selecting multimedia or computer stored information. More particularly, the present invention relates to an improved user interface for a variety of applications, including but not limited to a multi-media video and audio editing system.

2. Art Background

Over the past decade, a variety of graphical user interfaces have been developed to ease human interaction with computer systems. Many display systems utilize metaphors in the design of the interface as a way of maximizing human familiarity, and conveying information between the user and the computer. It is common for computer systems incorporating so-called "object oriented" display systems to utilize multiple "windows" on a display in which combinations of text and graphics are disposed. The display systems utilize familiar metaphors, such as desktops, control panels, notebooks and the like, such that the interface takes advantage of existing human mental structures to permit a user to draw upon the metaphor analogy to understand the requirements of the particular computer system.

It is well known that designing around a familiar metaphor helps reduce human learning time. (See for example, Patrick Chan, "Learning Considerations in User Interface Design: The Room Model", Report CS-84-16, University of Waterloo Computer Science Department, Ontario, Canada, July, 1984, and the references cited therein.) The ability to operate on images or objects which relate the user to actual objects on, for example, a desktop, results in a stronger man-machine interface. (See for example, D. Robson, "Object Oriented Software Systems", BYTE, August 1991, page 74, Vol. 6, No. 8; L. Tesler, "The Smalltalk Environment", BYTE, August 1981, page 90, Vol. 6, No. 8; and Smith, et al., "Star User Interface: An Overview", National Computer Conference, 1982; Jeffrey J. Blatt, "A Primer on User Interface Patents," The Computer Lawyer, April 1992, Vol. 9 No. 4.

Research in interface design using metaphors in man-machine interfaces may be applied to computer controlled editing systems to incorporate and integrate various production media resources, such as special effects, music, graphics and the like. In the case of an editing system, a variety of resources must be integrated, scheduled and coordinated with one another to obtain a complete multi-media product. It is therefore desirable to allow a user to perform these functions, integration, scheduling and coordination, with a minimum of operations. Further, it is desirable to allow the user to coordinate a variety of interrelated functions and to provide a display that allows the user to view the association between a function and the element the function is to affect.

These goals, minimizing operations, coordination and association, are important for a wide variety of applications apart from the context of a video editor. The present invention achieves these goals for a video editor and a wide variety of other applications.

SUMMARY OF THE INVENTION

The present invention provides apparatus and methods for use in computer display systems, and in particular, a graphical user interface for use in computer systems. A display system including at least one central processing unit (CPU) is coupled through appropriate input/output (I/O) circuitry to input devices, such as a cursor control device. The CPU is further coupled to a storage device for the storage of data and programs. The CPU is also coupled to a display device on which the present invention's user interface is displayed.

The user interface of the present invention includes a function palette that displays a variety of function icons. Each function icon corresponds to a function that a user may wish to perform. The user selects a function icon from the palette corresponding to the desired function and the user places a copy of the icon at that point in the display where the function is to be performed. For example, in the context of a multimedia video editor, the user may place an icon on a timeline that corresponds to source material. The desired function will then be performed on the source material at that point where the user placed the icon, either immediately or upon subsequent command from the user.

The present invention has a very wide range of applications and may be used in conjunction with any type of computer program that performs functions that may be represented by icons.

BRIEF DESCRIPTION OF THE DRAWINGS

FIG. 2 illustrates one embodiment of the graphical user interface of the present invention in the context of a video editor.

FIG. 3a illustrates a plurality of timelines that represent source material for a video editor.

FIG. 3b illustrates the timelines of FIG. 3a with a "synchronize" function icon placed at a particular location.

FIG. 3c illustrates the result of the icons as displayed in FIG. 3b.

FIG. 4a illustrates the timelines of FIG. 3a with "paste" and "split" icons placed at particular locations.

FIG. 4b illustrates the result of the icons as displayed in FIG. 4a.

FIG. 5a illustrates the timelines of FIG. 3a with a "split" icon placed within a single block.

FIG. 5b illustrates the result of the icons as displayed in FIG. 5a.

FIG. 6a illustrates the timelines of FIG. 3a with "trim" icons placed at particular locations.

FIG. 6b illustrates the result of the icons as displayed in FIG. 6a.

FIG. 7b illustrates the electronic spreadsheet of FIG. 7a after a user has applied examples of the proxy icons of the present invention to the spreadsheet.

NOTATION AND NOMENCLATURE

Figure 1:
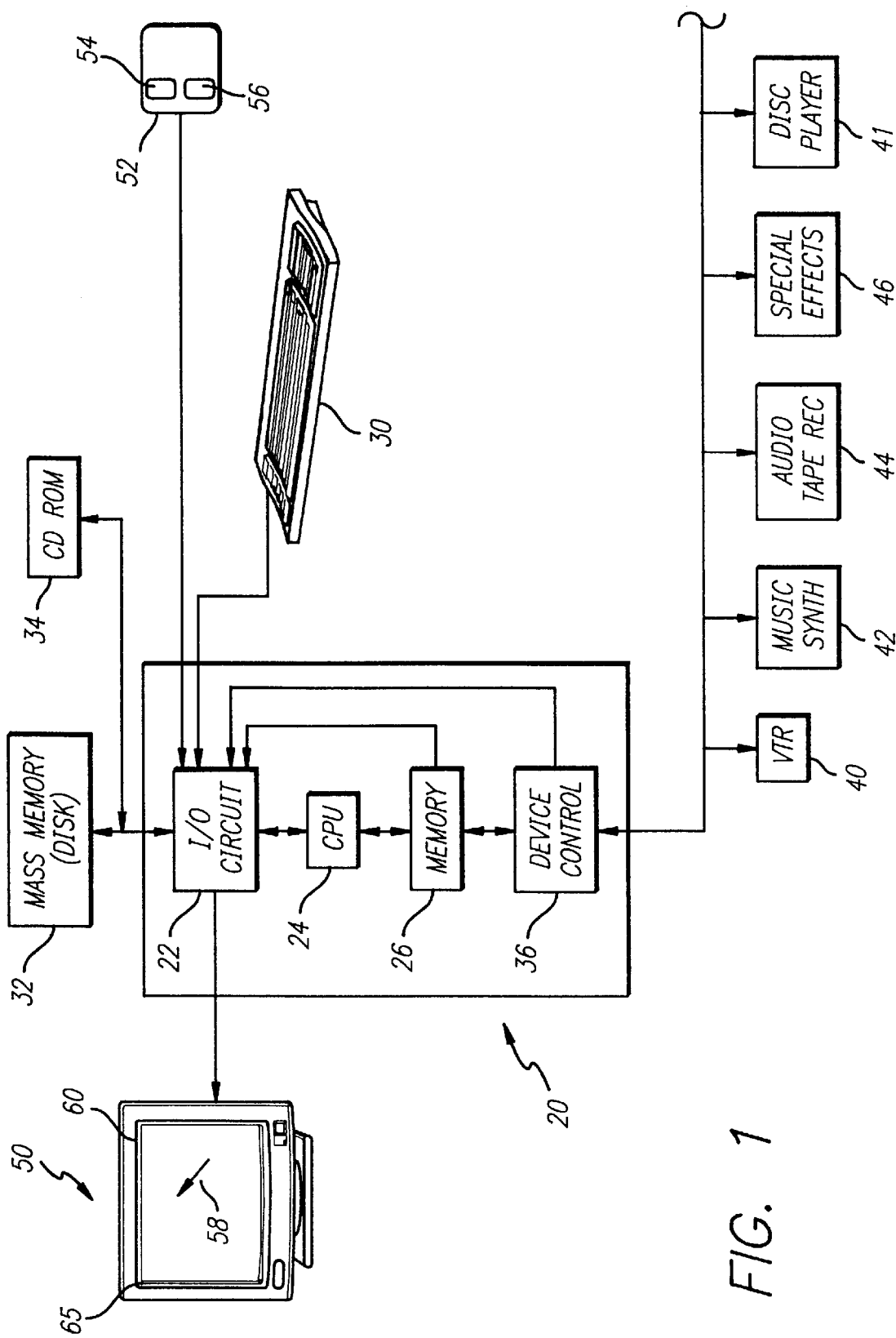
FIG. 1 is a functional block diagram illustrating one possible computer display system incorporating the teachings of the present invention.

The detailed descriptions which follow are presented largely in terms of algorithms and symbolic representations of operations on data bits within a computer memory. These descriptions and representations are the means used by those skilled in the data processing arts to most effectively convey the substance of their work to others skilled in the art.

An algorithm is here, and generally, conceived to be a self-consistent sequence of steps leading to a desired result.

These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar digital devices. In all cases there should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

The present invention discloses methods and apparatus for an improved graphical user interface. Although the present invention is described with reference to specific icons, windows and applications programs etc., it will be appreciated by one of ordinary skill in the art that such details are disclosed simply to provide a more thorough understanding of the present invention. It will therefore be apparent to one skilled in the art that the present invention may be practiced without these specific details.

Referring to FIG. 1, the hardware configuration of the present invention is conceptually illustrated. FIG. 1 illustrates a computer editing system for generating a window-based graphic user interface in accordance with the teachings of the present invention. As illustrated, the computer editing system includes a computer 20 which comprises four major components. The first of these is an input/output (I/O) circuit 22, which is used to communicate information in appropriately structured form to and from other portions of the computer 20. In addition, computer 20 includes a central processing unit (CPU) 24 coupled to the I/O circuit 22 and to a memory 26. These elements are those typically found in most computers and, in fact, computer 20 is intended to be representative of a broad category of data processing devices.

Also shown in FIG. 1 is a keyboard 30 for inputting data and commands into computer 20 through the I/O circuit 22, as is well known. Similarly, a CD ROM 34 is coupled to the I/O circuit 22 for providing additional programming capacity to the system illustrated in FIG. 1. It will be appreciated that additional devices may be coupled to the computer 20 for storing data, such as magnetic tape drives, buffer memory devices, and the like. A device control 36 is coupled to both the memory 26 and the I/O circuit 22, to permit the computer 20 to communicate with multi-media system resources. The device control 36 controls operation of the multi-media resources to interface the multi-media resources to the computer 20. For example, in a video editing environment, the computer 20 may be coupled through the device control 36 to a video tape recorder 40, a music synthesizer 42, an audio tape recorder 44, a special effects resource 46, and a disc player 41 as shown. The device control 36 may comprise an independent control and interface device or a software process for execution by the CPU 24.

A display monitor 50 is coupled to the computer 20 through the I/O circuit 22. In the preferred embodiment, the display monitor 50 will comprise a high resolution color display with 16 or more bits of color per pixel but the display monitor 50 may comprise an 8 bit color display. A cursor control device 52 includes switches 54 and 56 for signally the CPU 24 in accordance with the teachings of the present invention. Cursor control device 52 (commonly referred to a "mouse") permits a user to select various command modes, modify graphic data, and input other data utilizing switches 56 and 54. More particularly, the cursor control device 52 permits a user to selectively position a cursor 58 at any desired location on a display screen 60 of the display 50. As illustrated in FIG. 1, the cursor 58 is disposed with a window 65 in the present invention's graphic user interface, to be described more fully below. Moreover, in the presently preferred embodiment, the present invention's window-based user interface is generated and displayed using software stored in either memories 26, 32 or CD ROM 34, and executed by the CPU 24.

In the presently preferred embodiment, the cursor control 52 utilizes well known apparatus and methods for signaling CPU 24 of position changes of cursor 58 by movement of the cursor control over a surface. However, it will be appreciated by one skilled in the art that a variety of well known cursor control devices may be utilized by the present invention, including other control devices such as mechanical mice, trackballs, joy sticks, graphic tablets, other keyboard or so called virtual reality inputs and the like. The cursor control 52 in FIG. 1 is intended to encompass all such equivalent devices.

Referring to FIG. 2, a graphical user interface for a computer editing system configured in accordance with the present invention is illustrated. The computer 20 displays on the display screen 60 a graphical user interface that permits a user of the computer editing system to perform a number of re-editing functions. The graphical user interface displayed on the display screen 60 contains a plurality of tracks 76 and 78 that display timelines that include any number of source blocks 80, 82, 84, 86, 88, 90, 92, 94, 96 and 98 arranged in a sequence. The track 76 corresponds to video and the track 78 corresponds to audio. The source blocks 80, 82, 84, 86, 88, 90, 92, 94, 96 and 98 correspond to underlying source material that comprise the final, edited product. For example, the source block 80 may correspond to a video recording of a parachute jump from the ground while the block 84 may correspond to a video view from the perspective of the parachuter. An editor manipulates the source blocks to achieve a desired sequence.

The editor manipulates the source blocks by performing various functions such as cutting and splicing. The present invention provides an improved method and apparatus for performing these functions and almost any other type of functions. According to the present invention, a function palette 68 is displayed within the display screen 60. The function palette 68 includes a plurality of icons 62, 64, 66, 70, 72 and 74, that represents functions that the user may wish to perform.

In one embodiment, the user implements the desired function by selecting an icon with the mouse 52. The user positions the cursor 58 on one of the icons 62, 64, 66, 70, 72 and 74 that represents a desired function and clicks a button 54 on the mouse 52 to select the item. With the button 54 depressed, the user drags a copy of the icon and places it on one of the timelines 76 or 78 where it is desired to perform the function. The copy of the icon is positioned on the display screen 60 where the user releases the button 54.

The icon function indicates that a corresponding function is to be preformed at the point where the icon was placed. For example, an icon 62 may represent a 8 "paste" function that indicates that the source blocks 80 and 82 are to remain attached. Thus, if the user moves the source block 82 to the right, the source block 80 will correspondingly move.

The memory 26 of computer 20 contains a program that causes the CPU 24 to detect a user's access to the palette 68. When one of the icons in the palette 68 is finally positioned on the display screen 60, the display address is provided to the computer 20 through an appropriate input/output routine. The address of the icon is then compared with an address table stored in the memory 26 to determine what function the icon will perform. The function may be performed immediately or upon further user input.

If the function is to be performed upon further user input, a flag may be set corresponding to the type of user input that will trigger the function. When this type of input is received by the computer 20, the flag is checked and if it indicates that a function may correspond to that type of input, the computer then determines whether the input triggers the function based upon location of the icon, screen position of the movement and other factors that may be stored in a table. The table may contain an address of the function to be performed that is accessed when the function is triggered. The function, in turn, may need to access the table to determine the results of the function. As will be appreciated by one of the skill in the art, there are other methods for performing functions according to the screen location of an icon.

The function to be performed by an icon may be modified by the positioning of the icon. For example, the function performed by an icon placed at the boundary of a block may be distinct from the function performed by an icon placed within a block. It will be appreciated that there are numerous adaptions of position dependent functionality for applications other than a multimedia editor.

FIGS. 3a–3c illustrate the operation of a synchronization function icon. FIG. 3a illustrates the tracks 76 and 78 comprised of a plurality of source blocks 100, 102, 104, 106, 108 and 110. The tracks 76 and 78 are displayed on the display screen 60. The source block 102 may correspond to video footage of two chimpanzees fighting over a banana while the source block 108 may correspond to the audio of the fighting chimpanzees. The editor may wish to synchronize the video source block 102 with the audio source block 108.

FIG. 3b illustrates the use of a function icon to synchronize the source blocks 102 and 108. The user positions an icon 112 on points within both the blocks 102 and 108 through the use of the mouse 52, as previously described. As will readily be appreciated, the icon 112 may comprise separate icons and also may comprise any shape and be positioned in a manner other than is shown in FIG. 3b.

FIG. 3c illustrates the result of the function icon 112 after the user has moved one of the blocks 102 or 108. If the user has moved the block 102 to an earlier point on the track 76, corresponding to a leftward movement, the icon 112 ensures that the block 108 moves along with the source block 102. Similarly, if the user moves the source block 108, the icon 112 ensures that the block 102 moves correspondingly. Thus, the synchronization icon ensures that the video block 102 and the audio block 108 remain synchronized.

FIGS. 4a–4b illustrate "paste" and "split" icons applied to the tracks 76 and 78 as illustrated in FIG. 3a. In one embodiment, to ensure that the block 102 and the block 104 move together, the user places a paste "icon" on both the block 102 and the block 104. In alternate embodiments, the user may place a "paste" icon 120 on the boundary of either of the blocks 102 or 104 and an arrow may indicate the direction of the "paste." Many other alternatives are possible. Similarly, to ensure that the block 110 does not move with the block 108, an icon 122 is placed on the boundaries of the blocks 108 and 110 as illustrated. In practice, a default will dictate whether a block moves with an adjoining block and only the "paste" icon 120 or the "split" icon 122 may be necessary. FIG. 4a also illustrates a synchronization icon 112 that has been placed on blocks 102 and 108 to ensure that these blocks move together, as previously described.

FIG. 4b illustrates the results of the "paste" icon 120 and the "split" icon 122 in conjunction with the synchronization icon 112, after the source blocks 102 and 108 have been moved. The user has provided inputs that move the source blocks 102 to the left and icon 112 causes block 108 to move synchronously with the block 102. It will be appreciated that the source blocks 102 and 108 may also move independently. As shown, the source block 104 has moved along with the source block 102 while the source block 110 has remained in place. Another split icon 124 may be displayed on the block 110 after the movement of the source block 108.

FIGS. 5a–5b illustrate similar operations similar to those shown in FIGS. 4a–4b except with the "split" icon 122 applied to a single block 121. A split icon within a single block splits the block when a part of the block is moved. The interface may allow the user to move only part of a block or an entire block and if the user moves that part of the block to the left of icon 122, the block 121 will split into pieces according to the placement of icon 122. FIG. 4b illustrates the results of the "split" icon 122 after the left of the source block 121 has been moved. As shown, the block 121 has been split into blocks 108 and 110. Had the user moved the entire block 121, as opposed to part of the block 121, the block 121 would not have split. Another split icon 124 may be displayed on the block 110 after the movement of the source block 108.

FIGS. 6a and 6b illustrate the use of "trim" icons applied to the tracks 76 and 78 as illustrated in FIG. 3a. As illustrated in FIG. 6a, a low priority trim icon 130 is placed on the source block 102 and a high priority trim icon 132 is placed on the source block 108. When the user moves a source block over a different source block, the priority of the trim icon indicates which source block will be trimmed. In practice, a default will dictate whether a moving block or a stationary block will be trimmed and thus only the low priority icon 130 or the high priority icon 132 may be necessary. The user may adjust the default depending upon which setting is more efficient.

FIG. 6b illustrates the results of the low priority trim icon 130 and the high priority trim icon 132. When the block 102 was moved to the right, its source material was trimmed while the source material of the block 110 was trimmed when the block 108 was moved to the right.

Figure 7A:
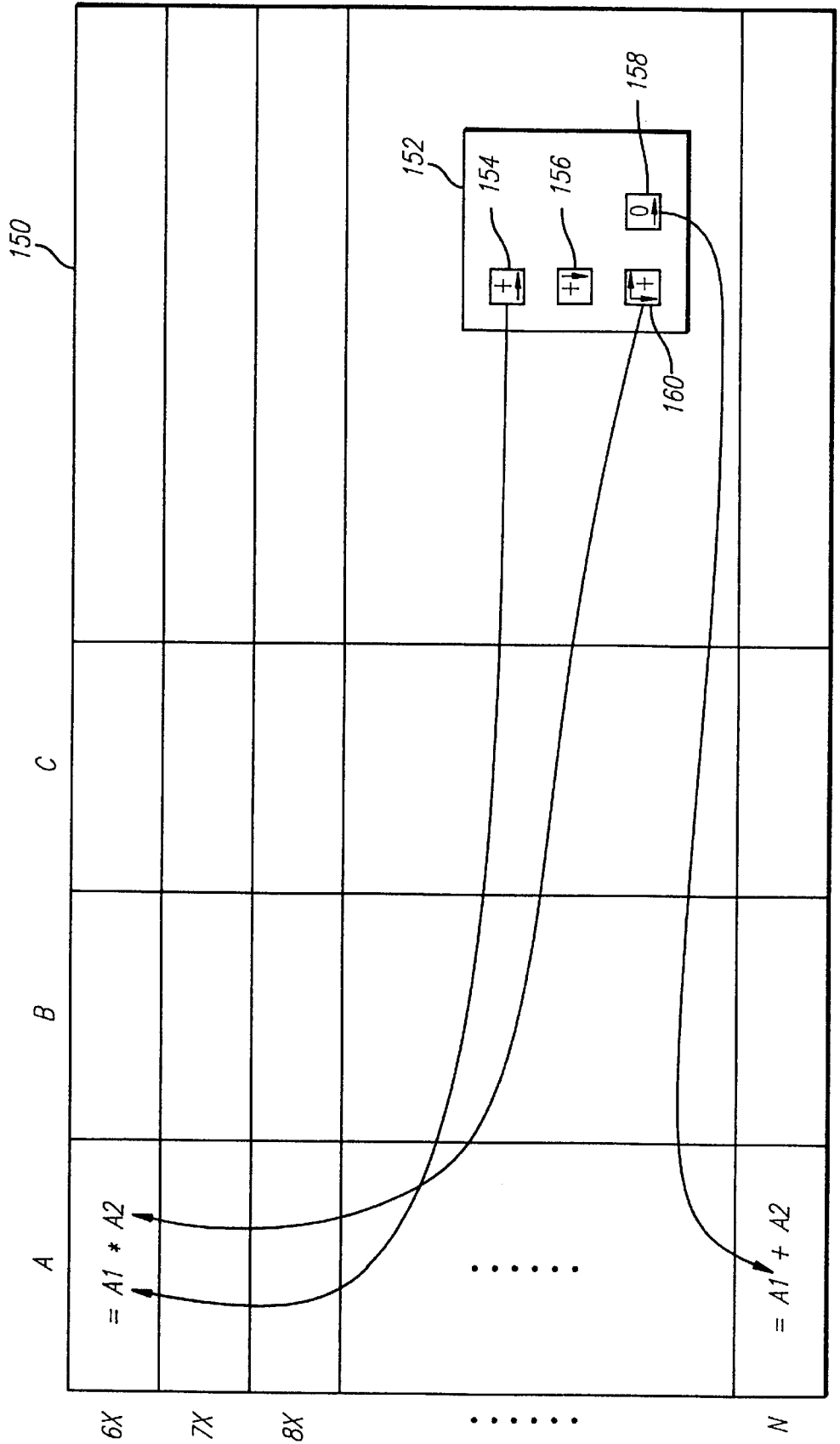
FIG. 7a illustrates the graphical user interface of the present invention for use in conjunction with an electronic spreadsheet.

The present invention has a variety of applications in contexts other than video editors. FIG. 7a illustrates a spreadsheet 150 configured according to the graphic user interface of the present invention and displayed on the display screen 60. A function palette 152 includes a plurality of function icons, including "increment right" icon 154, "increment down" icon 156, "substitution icon" 158, "increment both" icon 160. The icons may be placed next to cell indicators that occur in formulae within a cell. For example, cell A6 is set equal to "A1*A2" and the increment right icon 154 is placed next to "A1" as shown while the increment both icon 160 is placed next to "A2" as shown.

In one embodiment, for the "increment right" icon 154, the spreadsheet automatically fills in any blank cells to the right of cell A6 with the value of A1 incremented by the number of columns to the right. Thus, for example, cell B6 would contain A1 incremented by one column for a value of B1 while cell C6 would be incremented by 2 columns for the value of C1. The "increment down" icon 156 has similar operation except that the row numbers are incremented instead of the columns. The increment both icon increments both the row and the column. In an alternate embodiment, the values are incremented after the user clicks on the cell A6 and drags the cursor to a different cell.

FIG. 7b illustrates the value in the cells after the user has dragged the cursor to cell C8. As shown in the figure, the value A2 in cell A6 has been incremented both right and down while the value A1 in cell A6 has been incremented to the right. Thus, cell B6 contains the formula "B1*B2", cell C6 contains the formula "C1*C2", cell B7 contains the formula "B1*B3" and the remaining cells contain the appropriate formulae as shown.

The "substitution icon" 158 substitutes the current cell value where the default is to transfer the same formula terms. For example, as illustrated in FIG. 7a, cell AN contains the value "A1+A2" and the "substitution icon" 158 placed next to "A1" ensures that the value in cells to the right of AN are substituted for "A1." As shown in FIG. 7b, cell BN contains the formula "BN+A2" where BN has been substituted, according to the "substitution icon" 158, for "A1" and "A2" has been copied from cell AN, which is the default procedure.

The "substitution icon" 158 is not required if substitution is the default when cells are copied. However, if substitution is the default, then a "hold constant" icon may be used to alter the default of substitution. Similarly, "hold constant right" and "hold constant down" icons may be used as the complementary icons for the "increment right" icon 154 and the "increment down" icon 156.

The present invention may also be used in conjunction within a data processing system such as stock control records in a warehouse management system. In this case, the proxy icons of the present invention may represent processing functions on datasets within the data processing system. For example, count, merge, replace, sort, move, sum and select icons may be employed and the functions might display a result when they are executed. For example, the sum of the values in the datasets may be displayed after a sum icon is selected by the user. The user may add icons to the model to show the processes that occur on each dataset in response to the triggering function.

As yet another example of the application of the present invention, proxy icons may be used in conjunction with a computer drawing package. Proxy icons may be attached to faces or vertices of graphical objects to indicate how the object should transform in various circumstances. Exemplary icons may include "vertical constrain," "horizontal constrain," "stretch" and "stay attached to adjacent" icons. Many other icons are possible.

Although the present invention has been described in terms of a preferred embodiment, it will be appreciated that various modifications and alterations might be made by those skilled in the art without departing from the spirit and scope of the invention. The present invention is applicable to a wide variety of applications and should therefore be measured in terms of the claims which follow.

I claim:

1. A method for editing multimedia information comprising steps of:

displaying a trim icon representing a trim function;

displaying a program data representing the multimedia information;

receiving a first input from a user, the first input selecting the trim icon;

receiving a second input from the user, the second input positioning the trim icon on the program data;

receiving a third input from the user, the third input dragging a portion of the program data toward the trim icon; and activating the trim function to trim off the portion of the program data.

2. The method of claim 1 wherein the trim icon is associated with a priority level.

3. The method of claim 2 wherein the trim function trims off the portion of the program data according to the priority level of the trim icon.

4. The method of claim 1 further comprising displaying a palette including the trim icon.

5. The method of claim 1 wherein at least one of the first, second, and third inputs includes input from a date entry device.

6. The method of claim 1 wherein the step of activating the trim function further comprises the step of automatically activating the trim function.

7. An apparatus for editing multimedia information comprising:

first display means for displaying a trim icon representing a trim function;

second display means for displaying a program data representing the multimedia information;

first receiving means for receiving a first input from a user, the first input selecting the trim icon;

second receiving means for receiving a second input from the user, the second input positioning the trim icon on the program data;

third receiving means for receiving a third input from the user, the third input dragging a portion of the program data toward the trim icon; and activating means for activating the trim function to trim off the portion of the first program data.

8. The apparatus of claim 7 wherein the trim icon is associated with a priority level.

9. The apparatus of claim 8 wherein the trim function trims off the portion of the program data according to the priority level of the trim icon.

10. The apparatus of claim 7 further comprising third display means for displaying a palette including the trim icon.

11. The apparatus of claim 7 wherein at least one of the first, second, and third inputs includes input from a data entry device.

12. The apparatus of claim 7 wherein the activating means automatically activates the trim function.

* * * * *

UNITED STATES PATENT AND TRADEMARK OFFICE
CERTIFICATE OF CORRECTION

PATENT NO. : 5,874,952
DATED : February 23, 1999
INVENTOR(S) : Oliver F. Morgan

It is certified that error appears in the above-indentified patent and that said Letters Patent is hereby corrected as shown below:

In column 8 at line 44 delete "date" and insert --data--

Signed and Sealed this

Twenty-sixth Day of October, 1999

Attest:

Q. TODD DICKINSON

Attesting Officer

Acting Commissioner of Patents and Trademarks